(12) United States Patent
Park et al.

(10) Patent No.: US 11,151,138 B2
(45) Date of Patent: Oct. 19, 2021

(54) COMPUTER PROGRAM FOR PROCESSING A PIVOT QUERY

(71) Applicant: TmaxData Co., Ltd., Seongnam-si (KR)

(72) Inventors: Sang Young Park, Seoul (KR); Dongyun Yang, Seoul (KR); Jooho Lee, Seongnam-si (KR)

(73) Assignee: TMAXDATA CO., LTD., Seongnam-si (KR)

( * ) Notice: Subject to any disclaimer, the term of this patent is extended or adjusted under 35 U.S.C. 154(b) by 215 days.

(21) Appl. No.: 16/425,342

(22) Filed: May 29, 2019

(65) Prior Publication Data

US 2020/0349165 A1 Nov. 5, 2020

(30) Foreign Application Priority Data

May 2, 2019 (KR) ........................ 10-2019-0051778

(51) Int. Cl.
*G06F 7/00* (2006.01)
*G06F 16/2455* (2019.01)
*G06F 16/22* (2019.01)
*G06F 16/28* (2019.01)

(52) U.S. Cl.
CPC .... *G06F 16/24556* (2019.01); *G06F 16/2255* (2019.01); *G06F 16/2282* (2019.01); *G06F 16/285* (2019.01)

(58) Field of Classification Search
CPC ............. G06F 16/24556; G06F 16/285; G06F 16/2255; G06F 16/2282

USPC .................................................. 707/600–899
See application file for complete search history.

(56) References Cited

U.S. PATENT DOCUMENTS

| | | | |
|---|---|---|---|
| 6,298,342 B1 | 10/2001 | Graefe et al. | |
| 6,604,095 B1 | 8/2003 | Cesare et al. | |
| 8,041,731 B2 | 10/2011 | Bellamkonda et al. | |
| 9,208,195 B2 | 12/2015 | Srinivasa et al. | |
| 2009/0024604 A1* | 1/2009 | Zhao | G06F 16/3346 |
| 2010/0017363 A1 | 1/2010 | Bellamkonda et al. | |
| 2018/0349374 A1 | 12/2018 | Gurajada et al. | |

OTHER PUBLICATIONS

Korean Office Action dated Jul. 16, 2020, in connection with corresponding Korean Patent Application No. 10-2019-0051778.
Wookoa, "How to use Oracle Pivot: as a grouping concept" Nov. 9, 2017. http://wookoa.tistory.com/240.

\* cited by examiner

*Primary Examiner* — Isaac M Woo
(74) *Attorney, Agent, or Firm* — Hauptman Ham, LLP

(57) ABSTRACT

Disclosed is a non-transitory computer readable medium storing computer program which is executable by one or more processors. The computer program allows the one or more processors to execute the following operations for performing a pivot query when the computer program is executed by one or more processors and the operations may include: identifying one or more classification factors from a query when receiving the query from a client; generating a search table for filtering records corresponding to at least one row of a table corresponding to the query based on the one or more classification factors; and generating a result table by performing an aggregation of a plurality of records included in the table based on the search table.

12 Claims, 12 Drawing Sheets

FIG. 4

```
SELECT * FROM T
PIVOT(SUM(C2) FOR C3 IN ('Red','Blue'));
        410   420      430  431  432
```

```
SELECT C1, SUM(C3 CASE WHEN 'Red' THEN C2 ELSE NULL),
           SUM(C3 CASE WHEN 'Blue' THEN C2 ELSE NULL)
FROM T
GROUP BY C1;
         440
```

Table 450

| C2 | C2 | C3 |
|----|----|------|
| 1  | 1  | Red  |
| 1  | 1  | Blue |
| 1  | 1  | Red  |
| 1  | 1  | Blue |
| 2  | 3  | Red  |
| 2  | 7  | Blue |
| 2  | 1  | Red  |
| 3  | 6  | Red  |
| 3  | 5  | Red  |
| 4  | 4  | Blue |

Result Table 460

| C1 | 'Red' | 'Blue' |
|----|-------|--------|
| 1  | 2     | 2      |
| 2  | 4     | 7      |
| 3  | 11    | NULL   |
| 4  | NULL  | 4      |

FIG. 5

Search Table (500)

| value | hash value | index |
|-------|------------|-------|
| Red   | a12dx      | 1     |
| Blue  | b2341      | 2     |
|       |            |       |
|       |            |       |

510  520  530

Result Table (540)

| C1 | 'Red' | 'Blue' |
|----|-------|--------|
| 1  | 2     | 2      |
| 2  | 4     | 7      |
| 3  | 11    | NULL   |
| 4  | NULL  | 4      |

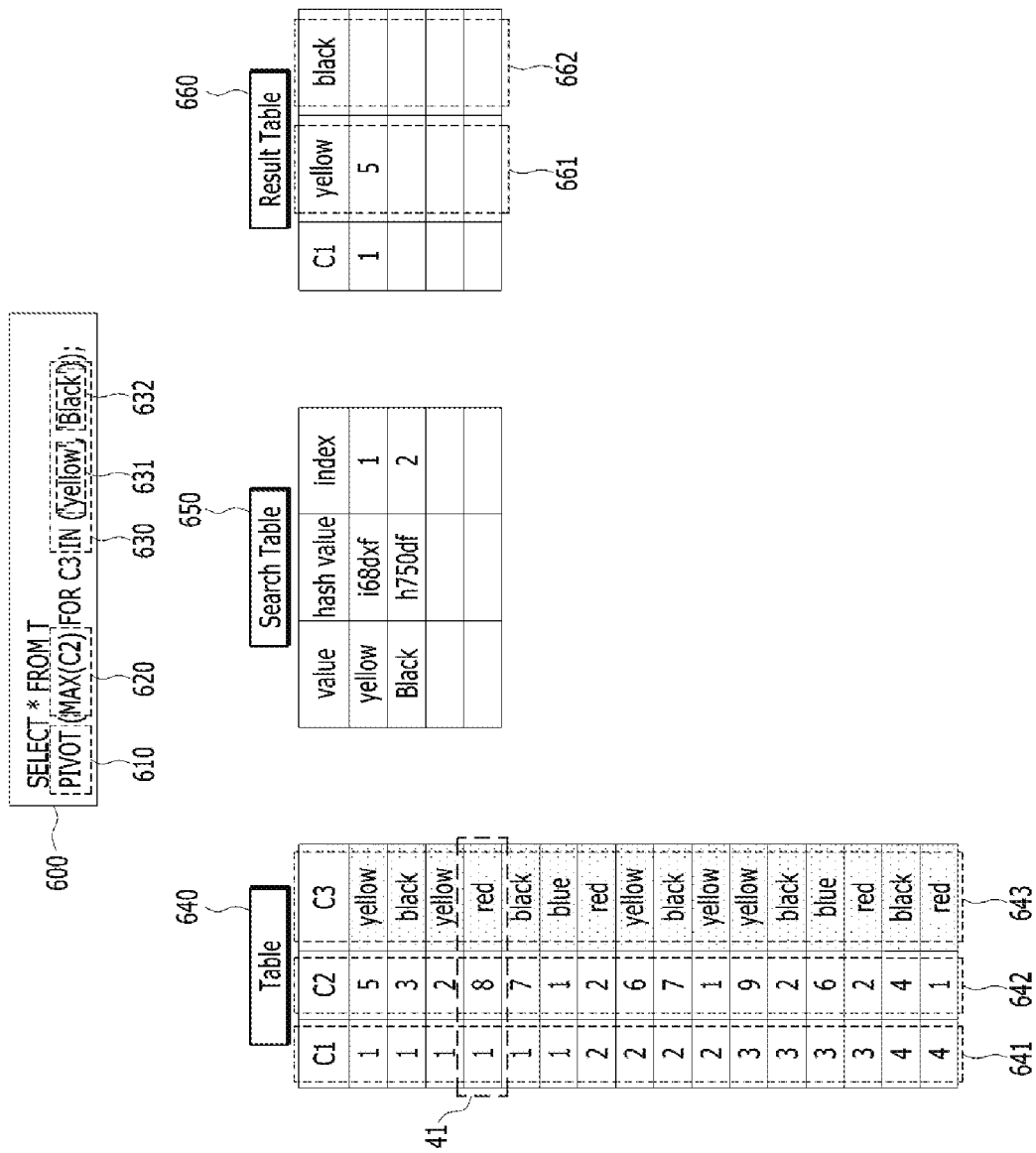

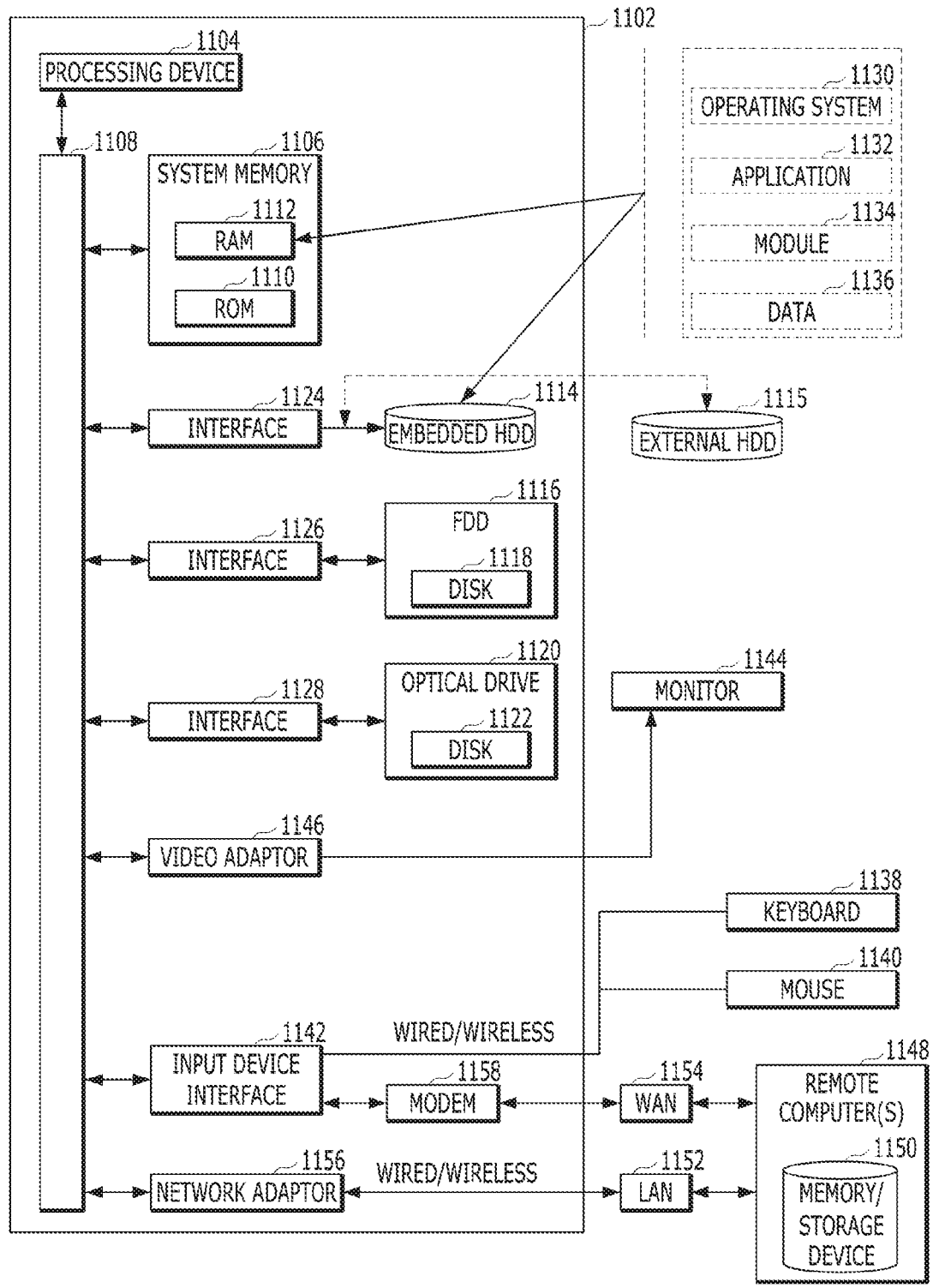

COMPUTER PROGRAM FOR PROCESSING A PIVOT QUERY

CROSS-REFERENCE TO RELATED APPLICATIONS

This application claims priority to and the benefit of Korean Patent Application No. 10-2019-0051778 filed in the Korean Intellectual Property Office on May 2, 2019, the entire contents of which are incorporated herein by reference.

TECHNICAL FIELD

The present disclosure relates to database management, and more particularly, to a computer program for enhancing processing performance of a pivot query.

BACKGROUND ART

A database means a set of standard data integrated and managed so as to be shared and used by multiple persons. In general, data associated with a specific area of an organization are collected and may be used for providing information for supporting multiple levels of decision making.

As the amount of data becomes bigger today, a database management system (hereinafter referred to as a DBMS) which efficiently supports retrieval or change of data in order to retrieve or change data required in the database is increasingly utilized.

The DBMS may store all data in the database in the form of a table and express data as a relationship and provide the expressed data to a user. That is, the DBMS may provide the data in a bundle format of tables of constituted by sets of rows and columns and provide a relationship operator capable of operating table-format data.

The table refers to a basic structure storing data in the database and one table is constituted by one or more records. When a specific query is input from the outside, the DBMS may acquire a desired output from the table in response to the input query.

Here, the query which refers to a predetermined request for the data stored in the table of the database, that is, describing what kind of operation is desired to be performed for the data may be expressed through a language such as a structured query language (SQL).

Meanwhile, in recent years, a demand for big data analysis has been expanded steadily and the size of data to be analyzed has been continuously grown. A need to increase a probability of business success by making decision based on the big data analysis is increasing, and enhancement of big data analysis performance is becoming a required technology in a real-time enterprise environment.

In order to analyze more extensive data and make decisions at different levels, multi-directional analysis of the database may be required and to this end, specific data may be extracted through a report through a pivot query that performs filtering, sorting, reorganization, calculation, summarizing, and etc., of the database.

A pivot which is intended to be used to quickly summarize a large amount of data may be useful in handling numerical values due to summarizing original data in various ways or highlighting only a desired result. Further, the pivot may be usefully used when numerical value lists for acquiring a sum are long or a related sum is analyzed.

The pivot may quickly and easily analyze the data stored in the table of the database and relocate fields in row and column directions to easily determine and analyze the data.

However, in processing the pivot query in the DBMS in the related art, in order to identify records as the classification criterion in the pivot, records included in the table need to be compared with an expression serving as the classification criterion. Therefore, as a computation amount increases, a query processing time may increase. For example, when the number of expressions as the classification criterion in the query is 5, it may be inefficient because five expressions are compared with each other for multiple records in the table.

Thus, in processing the pivot query to perform the pivot for the table, there may be a need in the art for a computer program to enhance the performance of pivot query processing by minimizing the computation amount.

SUMMARY OF THE INVENTION

The present disclosure is contrived in response to the background art and has been made in an effort to provide a computer program for enhancing processing performance of a pivot query.

An exemplary embodiment of the present disclosure provides a non-transitory computer readable medium storing computer program which is executable by one or more processors. The computer program allows one or more processors to execute operations for managing a database when the computer program is executed by one or more processors and the operations may include: identifying one or more classification factors from a query when receiving the query from a client; generating a search table for filtering records corresponding to at least one row of a table corresponding to the query based on the one or more classification factors; and generating a result table by performing an aggregation of a plurality of records included in the table based on the search table.

Alternatively, when the query is received from the client, the identifying one or more classification factors from a query when receiving the query from a client may include identifying an SQL (Structured Query Language) for a pivot in the received query; and identifying one or more factors within IN clause in the SQL as the one or more classification factors if the SQL for the pivot is identified.

Alternatively, the one or more classification factors may be a record serving as a reference for classifying a plurality of records included in the table and the reference of each column in the result table.

Alternatively, the generating a search table for filtering records corresponding to at least one row of a table corresponding to the query based on the one or more classification factors may include generating a search hash value corresponding to each of one or more classification factors; and generating the search table by mapping the one or more classification factors, the search hash values and the out column index to the same row.

Alternatively, the search hash value may be a value uniquely generated to correspond to each of the one or more classification factors and information for identifying a row corresponding to each of the one or more classification factors in the table corresponding to the query.

Alternatively, the out column index may be an address information for the column in the result table for outputting an aggregation result for the plurality of records included in the table to correspond to each of the one or more classification factors.

Alternatively, the generating a result table by performing an aggregation of a plurality of records included in the table based on the search table may include reading one or more rows included in the table; identifying one or more records included in each of the one or more rows; and performing the aggregation, by comparing the one or more records included in each of the one or more rows and the search table and sequentially writing in the result table the one or more records included in the table.

Alternatively, the identifying one or more records included in each of the one or more rows may include identifying a record of a first column corresponding to one or more classification factors identified from the query, among one or more records included in each of the one or more rows; identifying a record of a second column that is a subject of the aggregation, among the one or more records included in each of the one or more rows; and identifying a record of a third column which is a reference of grouping, among the one or more records included in each of the one or more rows.

Alternatively, the performing of the aggregation, by comparing the one or more records included in each of the one or more rows and the search table and writing the one or more records included in the table to the result table sequentially may include comparing a record hash value for a record of a first column corresponding to one or more classification factors and one or more search hash values included in the search table, in each of the one or more rows; identifying a row in which a search hash value with the same hash value as a record hash value for the record of the first column is located, in the search table; and performing the aggregation by sequentially writing in the result table a record of a second column which is subject of the aggregation based on an out column index included in the identified row.

Alternatively, the performing of the aggregation by sequentially writing in the result table a record of a second column which is a subject of the aggregation based on an out column index included in the identified row may include generating one or more groups based on a record of a third column which is a reference of grouping, among one or more records included in each of the one or more rows; and performing the aggregation for each of one or more groups by writing a record of a second column in the result table sequentially based on the generated one or more groups and the out column index.

Alternatively, the result table may include columns based on the one or more classification factors, respective rows based on one or more records which is a reference of grouping in each row of the table and one or more result values calculated by group-by-group aggregation of one or more records subject to the aggregation corresponding to the columns and the rows.

Another exemplary embodiment of the present disclosure provides a computing device for performing a pivot query. The computing device may include: a processor including one or more cores; a storage storing program codes executable by the processor; and a network unit transmitting and receiving data with a client, in which the processor may identify one or more classification factors from a query when receiving the query from a client, generate a search table for filtering records corresponding to at least one row of a table corresponding to the query based on the one or more classification factors, and generate a result table by performing an aggregation of a plurality of records included in the table based on the search table.

Yet another exemplary embodiment of the present disclosure provides a method for performing a pivot query. The method may include: identifying one or more classification factors from a query when receiving the query from a client; generating a search table for filtering records corresponding to at least one row of a table corresponding to the query based on the one or more classification factors; and generating a result table by performing an aggregation of a plurality of records included in the table based on the search table.

According to an exemplary embodiment of the present disclosure, a computer program for enhancing processing performance of a pivot query in a database system can be provided.

BRIEF DESCRIPTION OF THE DRAWINGS

Various aspects are now described with reference to the drawings and like reference numerals are generally used to designate like elements. In the following exemplary embodiments, for the purpose of description, multiple specific detailed matters are presented to provide general understanding of one or more aspects. However, it will be apparent that the aspect(s) can be executed without the detailed matters.

FIG. 4 is an exemplary diagram for describing a general method for processing a pivot query according to an exemplary embodiment of the present disclosure.

FIG. 5 is an exemplary diagram for describing a method for processing a pivot query by using a search table according to an exemplary embodiment of the present disclosure.

FIGS. 6A to 6F are exemplary diagrams for describing a method for processing a pivot query by using a search table according to another exemplary embodiment of the present disclosure.

FIG. 8 is a simple and general schematic view of an exemplary computing environment in which exemplary embodiments of the present disclosure may be implemented.

DETAILED DESCRIPTION

Figure 1:
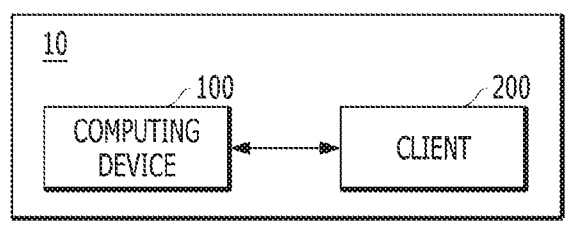
FIG. 1 is a schematic view of a database system according to an exemplary embodiment of the present disclosure.

Various exemplary embodiments will now be described with reference to drawings. In the present specification, various descriptions are presented to provide appreciation of the present disclosure. However, it is apparent that the embodiments can be executed without the specific description.

"Component", "module", "system", and the like which are terms used in the specification refer to a computer-related entity, hardware, firmware, software, and a combination of the software and the hardware, or execution of the software. For example, the component may be a processing process executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers. Further, the components may be executed by various computer-readable media having various data structures, which are stored therein. The components may perform communication through local and/or rewrote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to all of the case where X uses A, the case where X uses B, or the case where X uses both A and B. Further, it should be understood that the term "and/or" used in the specification designates and includes all available combinations of one or more items among enumerated related items.

It should be appreciated that the term "comprise" and/or "comprising" means that presence of corresponding features and/or components. However, it should be appreciated that the term "comprises" and/or "comprising" means that presence or addition of one or more other features, components, and/or a group thereof is not excluded. Further, when not separately specified or not clear in terms of the context that a singular form is indicated, it should be construed that the singular form generally means "one or more" in the present specification and the claims.

Those skilled in the art need to recognize that various illustrative logical blocks, configurations, modules, circuits, means, logic, and algorithm steps described in connection with the exemplary embodiments disclosed herein may be implemented as electronic hardware, computer software, or combinations of both sides. To clearly illustrate the interchangeability of hardware and software, various illustrative components, blocks, structures, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

In general, a pivot used in a DBMS is to easily identify and analyze a large amount of data stored in a table of a database by relocating fields in column and row directions. That is, a plurality of data may be sorted and combined based on specific data through a pivot. The combination of the plurality of data may include, for example, operations for various functions, which include a sum, an average, a median, a minimum, a maximum, and a distinct of the plurality of data.

When receiving the pivot query from a client, the DBMS may sort and combine, and process multiple data based on data as the reference of classification included in a query.

For example, in the case of receiving a query 400 illustrated in FIG. 4, records of a table 450 of the database are combined based on a red 431 and a blue 432 to generate a result table (or a pivot table) 460. More specifically, the pivot query 400 illustrated in FIG. 4 is to output a pivot table in which the column and the row are converted by calculating the sum 420 of data of column C2 for each group based on records included in column C1 based on each of the read 431 and the blue 432 in column C3 in the table. That is, the records included in column C1 may be based on grouping, the records included in column C2 may be subjected to summation, and the records included in column C3 may be the criterion of the pivot.

A process for performing the pivot query 400 illustrated in FIG. 4 may be represented by a concrete SQL statement 440. Referring to the SQL statement 440 of FIG. 4, only when the records included in column C3 are the red with the records included in column C1 as the criterion of the grouping, the sum of the records included in column C2 is calculated and recorded in a red column of the result table 460 and only when the records included in column C3 are the blue with the records included in column C1 as the criterion of the grouping, the sum of the records included in column C2 is calculated and recorded in a blue column of the result table 460 to generate the result table 460. That is, in order to execute the SQL statement 440 in FIG. 4, it is necessary to read whether each row includes the red as the cord and whether each row includes the blue as the record. Therefore, respective rows may need to be read as large as the number of factors in an IN clause of the pivot query 400.

That is, in the red column of the result table 460, the records in column C2 of a row in which the record of column C1 in the table 450 is 1 may be grouped and 2(1+1) which is a sum of the records of column C2 may be recorded, the records of column C2 of a row in which the record of column C1 is 2 may be grouped and 4(3+1) which is the sum of the records of column C2 may be recorded, and the records of column C2 of a row in which the record of column C1 is 3 may be grouped and 11(6+5) which is the sum of the records of column C2 may be recorded. In addition, when the record of column C1 is 4, column C2 does not contain the records corresponding to the red column of the result table (i.e., a row in which the record of column C3 of the table is red and the record of column C1 is 4), and as a result, NULL may be recorded in the result table. Further, in the blue column of the result table 460, when the records in column C2 of a row in which the record of column C1 in the table 450 is 1 may be grouped and 2(1+1) which is the sum of the records of column C2 may be recorded, the records of column C2 of a row in which the record of column C1 is 2 may be grouped and 7(7+0) which is the sum of the records of column C2 may be recorded, the record of column C2 does not exist in a row in which the record of column C1 is 3 and NULL may be recorded, and the records of column C2 of a row in which the record of column C1 is 4 may be grouped and 4(4+0) which is the sum of the records of column C2 may be recorded.

In other words, the result table 460 may be generated only by passing through two discrimination processes whether the records of column C3 is red or blue for each row with respect to a plurality of records which exists in the table 450. This may cause a speed of query processing to be increased in the DBMS. As a specific example, when there are 10 records as the criterion of the classification, are included in the pivot query, the plurality of records which exists in the table may need to be subjected to 10 discrimination processes for each row. That is, since comparison processes are required as large as the number of data which become the criterion of the classification per one row of the table, as the data which becomes the classification criterion increases, the computation amount may increase (for example, when the record which becomes the classification criterion is 100, 100 comparison operations are required for each row in the table). In the DBMS, the increase in computation amount reduces the processing speed of the query, and as a result, the increase in computation amount may be inefficient.

The present disclosure may provide an enhancement effect of pivot query processing performance through reduction of a processing time for the pivot query by implementing a separate search table in the process of generating (or outputting) the result table (or pivot table) in the table in processing the pivot query. In the DBMS in the related art, which is described with reference to FIG. 4, the query, the table, and the records are just an example and the present disclosure is not limited thereto.

Hereinafter, a concrete configuration, an implementation method and the resulting effects of the present disclosure will be described in detail with reference to the drawings.

FIG. 1 is a schematic view of a database system according to an exemplary embodiment of the present disclosure.

As illustrated in FIG. 1, the database system 10 may include a computing device 100, a network, and a client 200.

The client 200 may mean a predetermined type of node(s) in a system having a mechanism for communication with the computing device 100 of the database. For example, the client may include a predetermined electronic device having connectivity with a personal computer (PC), a laptop computer, a workstation, a terminal, and/or the network. Further, the client may include a predetermined server implemented by at least one of agent, application programming interface (API), and plug-in.

According to an exemplary embodiment of the present disclosure, operations of the computing device 100 to be described below may be performed according to a query issued from the client.

The computing device 100 may include a predetermined type computer system or computer device such as a microprocessor, a mainframe computer, a digital single processor, a portable device, and a device controller. The computing device 100 may include a data management system (DBMS) and/or a persistent storage. The computing device 100 in the present disclosure may refer to predetermined type of node (s) in the database system 10.

The computing device 100 may include a device including a processor 130 and a storage 120 for executing and storing commands as a predetermined type of database, but is not limited thereto. That is, the computing device 100 may include software, firmware, hardware, or a combination thereof. The software may include an application(s) for generating, deleting, and modifying database tables, schemas, indexes, and/or data. The computing device 100 may receive a transaction from the client another computing device and exemplary transactions may include searching, inserting, modifying, deleting, and/or record management of the data, the table, and/or the index in the computing device 100.

The DBMS as a program for permitting the computing device 100 to perform operations including search, insertion, modification, deletion, and/or record management of required data may be implemented by the storage unit 120 and the processor 130 of the computing device 100. The DBMS implemented by the computing device 100 will be described below in detail with reference to FIG. 2.

Figure 2:
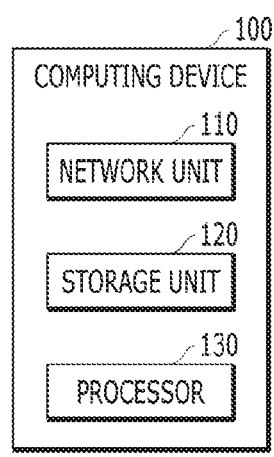
FIG. 2 is a block diagram of a computing device according to an exemplary embodiment of the present disclosure.

FIG. 2 is a block diagram of a computing device according to an exemplary embodiment of the present disclosure.

As illustrated in FIG. 2, the computing device 100 may include a network unit 110, a storage unit 120, and a processor 130. The aforementioned components are exemplary and the scope of the present disclosure is not limited to the aforementioned components. That is, additional components may be included or some of the aforementioned components may be omitted according to implementation aspects of exemplary embodiments of the present disclosure.

According to an exemplary embodiment of the present disclosure, the computing device 100 may include a network unit 110 transmitting and receiving data to and from the client 200. For example, when the network unit 110 is located outside the computing device 100, the network unit 110 may receive from the computing device 100 an output table generated by performing an operation based on the received SQL for a specific table. The network unit 110 may receive an input from the client 200. For example, the network unit 110 may receive from the client 200 requests related to storing, changing, and inquiring of data and building, changing, and inquiring of the index. Additionally, the network unit 110 may permit information transfer between the computing device 100 and the client 200 in a scheme of invoking a procedure to the computing device 100.

The network unit 110 according to an exemplary embodiment of the present disclosure may use various wired communication systems such as public switched telephone network (PSTN), x digital subscriber line (xDSL), rate adaptive DSL (RADSL), multi rate DSL (MDSL), very high speed DSL (VDSL), universal asymmetric DSL (UADSL), high bit rate DSL (HDSL), and local area network (LAN).

Further, the network unit 110 presented in this specification may use various wireless communication systems such as code division multi access (CDMA), time division multi access (TDMA), frequency division multi access (FDMA), orthogonal frequency division multi access (OFDMA), single carrier-FDMA (SC-FDMA), and other systems. As an additional exemplary embodiment, the network unit 110 in the present disclosure may include a database link dblink, and as a result, the computing device 100 communicates over the database link to bring data from another database server. The techniques described in the present specification may also be used in other networks in addition to the aforementioned networks.

According to an exemplary embodiment of the present disclosure, the storage unit 120 may include a persistent storage and a memory.

The persistent storage may mean a non-volatile storage medium which may consistently store predetermined data, such as a magnetic disk, an optical disk, and a magneto-optical storage device and a storage device based on a flash memory and/or battery-backup memory. The persistent storage may communicate with the processor 130 and the memory of the computing device 100 through various communication means. In an additional exemplary embodiment, the persistent storage is positioned outside the computing device 100 to communicate with the computing device 100.

The memory as a primary storage device directly accessed by the processor, such as a random access memory (RAM) including a dynamic random access memory (DRAM), a static random access memory (SRAM), etc., may mean a volatile storage device in which stored information is momentarily erased when power is turned off, for example, but is not limited thereto. The memory may be operated by the processor 130. The memory may temporarily store a data table including a data value and/or records depending on the transaction. The transaction in the present disclosure may generally mean consecutive processing units for a series of tasks such as exchange of information or database update. The transaction represents a basic unit of a task for completing a requested task while integrity of the database is guaranteed. The data table may include the data value and in the exemplary embodiment of the present disclosure, the data value of the data table may be written in the persistent storage from the memory. In an additional aspect, the memory may include the buffer cache and data may be stored in a data block of the buffer cache. The data stored in the buffer cache may be written in the persistent storage by a background process.

According to an exemplary embodiment of the present disclosure, the processor 130 may generally control an overall operation of the computing device 100. The processor 130 processes signals, data, information, etc., through the components described above or drives the application program stored in the storage unit 120 to perform operations for enhancing the pivot query processing performance in the DBMS.

According to an exemplary embodiment of the present disclosure, the processor 130 may receive the query from the client. The query which refers to a predetermined request for the data stored in the table of the database, that is, describing what kind of operation is desired to be performed for the data may be expressed through a language such as a structured query language (SQL). That is, when the processor 130 receives a specific query from the client 200, the processor 130 may provide a desired output from the table in response to the received query.

When the processor 130 receives the query from the client 200, the processor 130 may determine that the query is a query for the pivot and identify one or more classification factors from the query. One or more classification factors may be records as the criterion for classifying a plurality of records included in a specific table and identified through the query received from the client 200. Specifically, when the processor 130 receives the query from the client 200, the processor 130 may identify a SQL for the pivot in the received query. Further, when the SQL for the pivot is identified, the processor 130 may identify factors of the IN clause as one or more classification factors in the SQL.

As a specific example, when receiving the query 400 illustrated in FIG. 4 from the client 200, the processor 130 may identify a pivot 410 in the SQL statement of the query and when identifying the pivot 410 in the SQL statement, the processor 130 may identify factors 430 in the IN clause. In this case, the processor 130 may identify each of the factors 430 of the IN clause as red 431 and blue 432. Further, the processor 130 may identify factors 430 of the identified IN clause as one or more classification factors in the SQL statement. That is, the processor 130 may identify two factors (i.e., red 431 and blue 432) included in the IN clause as the classification factors as the criterion of the classification in the table 450 of the database from the query. A detailed description of the query and one or more classification factors included in the query is just an example and the present disclosure is not limited thereto.

According to an exemplary embodiment of the present disclosure, the processor 130 may generate the search table based on one or more classification factors. Specifically, the processor 130 may generate a search table for filtering records corresponding to at least one row in a table corresponding to the query based on one or more classification factors identified in the received query. Further, the processor 130 may maintain the generated search table on the memory.

More specifically, the processor 130 may generate search hash values corresponding to one or more classification factors, respectively. Specifically, the processor 130 may generate the search hash value through hashing for each of one or more classification factors. Further, the processor 130 maps one or more classification factors, search hash values, and out column indexes to the same row to generate the search table.

The search hash value as a value uniquely generated to correspond to each of one or more classification factors may be information for identifying rows corresponding to one or more classification factors in the table corresponding to the query received from the client. Further, the search hash value may include address information of a bucket storing record values corresponding to the one or more classification factors in the table of the database. That is, the search hash value may include address information for identifying one or more rows in the table corresponding to the query received from the client 200. Therefore, the records corresponding to the one or more classification factors, respectively may be indexed in the table of the database through the hash values matching one or more classification factors, respectively.

The out column index may include address information of a specific column of the result table for outputting an aggregation result for a plurality of records included in the table to correspond to one or more classification factors, respectively. That is, a result of performing aggregation of the plurality of records included in the table based on the out column index for each row of the search table may be recorded in a specific column of the result table.

As a specific example, referring to FIG. 5, when one or more classification factors identified in the query are 'red' and 'blue', the processor 130 may generate the search hash value as 'a12dx' through hashing for the classification factor 'red' and generate the search hash value as 'b2341' through having for the classification factor 'blue'. Further, the processor 130 maps one or more classification factors and out column indexes corresponding to the search hash values for the one or more classification factors to be included in the same row to generate a search table 500. As illustrated in FIG. 5, the processor 130 maps 'red', 'a12dx', and '1' to a first row and maps 'blue', 'b2341', and '2' to a second row to generate search table 500. The description of the hash value is just an example and the present disclosure is not limited thereto and may include a hash value having a predetermined length.

That is, the search table 500 may include a first column 510 including one or more classification factors, a second column 520 including the search hash values for the one or more classification factors, and a third column 530 including the out column index which is address information of a specific column in the result table.

According to an exemplary embodiment of the present disclosure, the processor 130 may read one or more rows included in the table. Specifically, when the processor 130 receives the query from the client, the processor 130 may read one or more rows in the table corresponding to the received query. For example, when receiving the query, the processor 130 may read all rows from a start row in which the records are first recorded up to a last row in which the records are last recorded in the table corresponding to the query.

The processor 130 may identify one or more records included in each of one or more vs included in the table. Specifically, when the processor 130 receives the query from the client, the processor 130 may read one or more rows in the table corresponding to the received query and identify one or more records included in each of the read one or more rows. As a specific example, referring to FIG. 4, when receiving the query 400 from the client, the processor 130 may read one or more rows included in the table 450 corresponding to the query 400 (that is, first to tenth rows) and identify one or more records included in each of one or more rows. In this case, the processor 130 may identify one or more records included in each of one or more rows in the table 450 (that is, first row—('1', '1', 'red'), second row—('1', '1', 'blue'), third row—('1', '1', 'red'), fourth row—('1', '1', 'blue'), fifth row—('2', '3', 'red'), sixth row—('2', '7', 'blue'), seventh row—('2', '1', 'red'), eighth row—('3', '6', 'red'), ninth row—('3', '5', 'red'), and tenth row—('4', '4', 'red')).

The processor 130 may identify the records of the first column corresponding to one or more classification factors among one or more records included in each of one or more rows in the table. Specifically, when the processor 130 receives the query from the client, the processor 130 may identify one or more classification factors from the received query and identify the records of the first column corresponding to the one or more classification factors in the table corresponding to the received query. In this case, the processor 130 may identify records corresponding to a column including at least one classification factor among one or more classification factors in the table as the records of the first column.

For example, referring to FIG. 4, when receiving the query 400 illustrated in FIG. 4, the processor 130 may identify one or more classification factors red 431 and blue 432 based on the received query 400 and identify the records of the first column including the one or more classification factors red 431 and blue 432 in the table 450 corresponding to the received query. In this case, the processor 130 may identify the records included in column C3 in the table 450. That is, the processor 130 may identify 'red' as the record of the first column corresponding to one or more classification factors in the first row of the table 450 and identify 'blue' as the record of the first column corresponding to one or more classification factors in the second row. Additionally, records corresponding to one or more classification factors in each of the third through tenth rows of the table 450 may also be identified through the records recorded in column C3. The concrete description of the records included in the table is just an example and the present disclosure is not limited thereto.

That is, the processor 130 may identify the records of the first column corresponding to one or more classification factors as the classification criterion of the records for each row in the table.

The processor 130 may identify the records of the second column to be aggregated among one or more records included in each of one or more rows in the table. Specifically, when the processor 130 receives the query from the client, the processor 130 may identify the records of the second column to be aggregated based on the received query. The processor 130 may identify records corresponding to a column included in an arithmetic function in the received query as the records of the second column to be aggregated.

For example, referring to FIG. 4, when receiving the query 400 illustrated in FIG. 4, the processor 130 may identify column C2 included in an arithmetic function 420 in the received query 400 and identify records corresponding to column C2 as the records of the second column to be aggregated in each of one or more rows of the table 450. That is, the processor 130 may identify '1' as the record of the second column to be aggregated in the first row of the table 450 and identify '3' as the record of the second column to be aggregated in a fifth row. The concrete description of the records included in the table is just an example and the present disclosure is not limited thereto.

That is, the processor 130 may identify the records of the second column to be aggregated for each row in the table.

The processor 130 may identify a record of a third column as the criterion of the grouping among one or more records included in each of one or more rows in the table. Specifically, when the processor 130 receives the query from the client, the processor 130 may identify the record of the third column as the criterion of the grouping based on the received query. The processor 130 may identify records corresponding to columns other than the columns corresponding to one or more classification factors and the column included in the arithmetic function as the record of the third column as the criterion of the grouping in the received query. In other words, the processor 130 may identify records corresponding to a column not included as a separate SQL statement in the received query as the records of the third column as the reference of the grouping.

For example, referring to FIG. 4, when receiving the query 400 illustrated in FIG. 4, the processor 130 may identify records corresponding to a column for column C1 which exists in the table 450, but is not included as a separate SQL statement in the received query 400 as the records of the third column as the criterion of the grouping in each of one or more rows of the table. That is, the processor 130 may identify '1' as the record of the third column as the criterion of the grouping in the first row of the table 450, '2' as the record of the third column as the criterion of the grouping in the fifth row, and '3' as the record of the third column as the criterion of the grouping in the eighth row. The concrete description of the records included in the table is just an example and the present disclosure is not limited thereto.

That is, the processor 130 may identify the records of the third column as the criterion of the grouping for each row in the table.

According to an exemplary embodiment of the present disclosure, the processor 130 may generate the result table by aggregating the plurality of records included in the table based on the search table. Specifically, the processor 130 may perform the aggregation by comparing the search table with one or more records included in each of one or more rows in the table and sequentially recording one or more records included in the table in the result table.

More specifically, the processor 130 may compare a record hash value for the record of the first column corresponding to one or more classification factors in each of one or more rows of the table with one or more search hash values included in the search table. Specifically, the processor 130 may identify a row in which a search hash value with the same hash value as the record hash value for the record of the first column in the search table is located.

The processor 130 may identify the out column index included in the row where the search hash value with the same hash value as the record hash value for the record of the first column in the search table is located and sequentially record the records of the second column in the result table based on the identified outer column index and aggregate the recorded records. In this case, the record hash values for the records of the first column included in the table through one or more hash values included in the search table may be indexed. In other words, the result table (e.g., pivot table) may be generated through one comparison for respective rows of the table through indexing based on the record hash value for a specific record (i.e., the record of the first column) of each row of the table and one or more search hash values included in the search table rather than comparing all of one or more classification factors which become the criterion of the classification with respect to one or more rows included in the table.

That is, the processor 130 may compare the search hash values for one or more respective classification factors included in the search table maintained on the memory and the hash values of the records of the first column corresponding to one or more classification factors in the table rather than comparing the numbers of one or more classification factors identified from the query to correspond to the rows of respective tables including the plurality of records. In other words, the processor 130 may generate the result table through one comparison with the search table for each row of the table.

Therefore, when processing a pivot query having a large number of classification criteria, the result table may be generated by processing the pivot query more efficiently by reducing the number of reading times of the table. Accordingly, the performance of the pivot query processing in the DBMS may be enhanced.

In an additional exemplary embodiment, the processor 130 may identify a row corresponding to a specific record among a plurality of records included in the table (i.e., identify a record hash value equal to the search hash value). Specifically, the processor 130 may read and index only records corresponding to a specific search hash value in the table and identify only records as the criterion of the classification and aggregate the identified records rather than comparing each row of the table with the search table. In this case, only the records corresponding to the classification factors identified in the query among the records included in the first column of the table may be identified and aggregated, and as a result, the processing performance of the pivot query may be further enhanced.

According to an exemplary embodiment of the present disclosure, the processor 130 may generate one or more groups based on the record of the third column as the criterion of the grouping among one or more records included in each of one or more rows in the table.

The processor 130 may perform the aggregation by sequentially recording one or more records included in the table in the result table based on one or more groups and out column indexes. More specifically, the processor 130 may sequentially record the records of the second column in the result table based on the out column index which is specific column address information of the result table included in one or more groups and search tables generated based on the record of the third column which becomes the reference of the grouping and aggregate the recorded records for each one or more groups.

That is, the result table may include a column based on each of the one or more classification factors and may include each row based on one or more records which become the criterion of the grouping in each row of the table. In addition, the result table may include one or more result values computed through the aggregation of one or more records to be aggregated to correspond to the column based on each of one or more classification factors and each row based on one or more records which become the criterion of the grouping for each group.

Figure 6A:
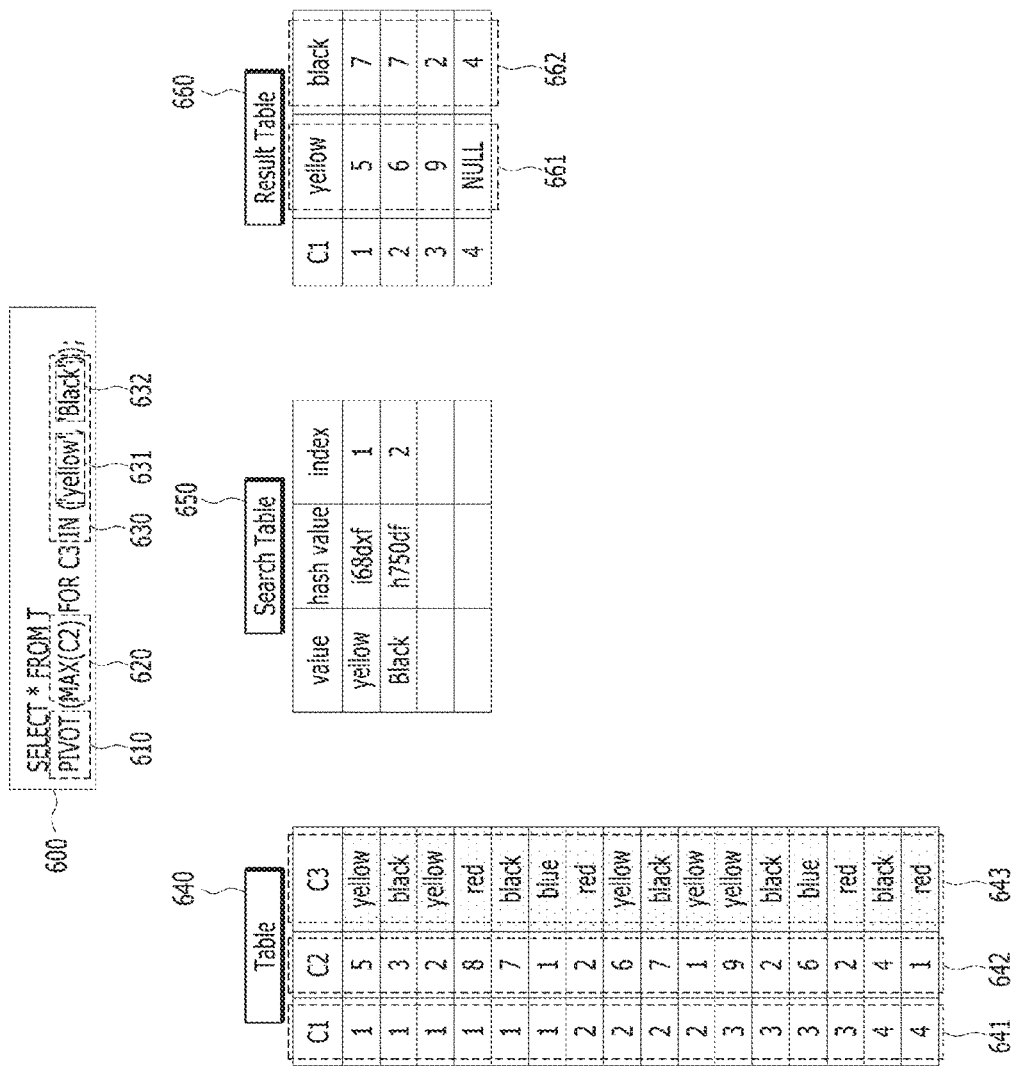

As a more specific example, referring to FIG. 6A, when a query 600 received from the client 200 is illustrated in FIG. 6A, the query 600 may be to calculate a maximum value (max) 620 of data of column C2 for each group based on the records included in column C1 based on each of yellow 631 and black 632 in column C3 in a table 640 and output a pivot table in which the column and the row are converted. That is, the records corresponding to column C1 may become the reference of the grouping, the records corresponding to column C2 may be a target for computing the maximum value (maxi, and data corresponding to column C3 may become the criterion of the pivot.

When receiving the query, the processor 130 may generate the search table 650 through the operations described above and maintain the generated search table 650 on the memory. The search table 650 may include one or more classification factors, search hash values corresponding to the one or more classification factors, respectively, and an out column index which is specific column address information of the result table. That is, in the search table 650 generated by the processor 130 in response to the received query 600, as illustrated in FIG. 6A, 'yellow', 'i68dxf', and '1' may be included in the first row and 'black', 'h750df', and '2' may be included in the second row. The aforementioned hash value is just an example and the present disclosure is not limited thereto.

The processor 130 may identify records of a first column 643 corresponding to 'yellow' and 'black' which are one or more classification factors in each of one or more rows located in the table 640. The records of the first column 643 of the table 640 may be records which become the criterion of the classification in the table 640. That is, the processor 130 may identify the records included in column C3 in the table 640 as the records of the first column 643. The processor 130 may generate record hash values for the identified records of the first column 643 and sequentially compare the hash values with one or more search hash values included in the search table 650 and record the compared hash values in a result table 660 and aggregate the recorded hash values.

Specifically, the processor 130 may read the first row of the table 640 and generate the record hash value (i.e., i68dxf) for 'yellow' which is the record (i.e., record as the criterion of the classification) of the first column 643 among the records included in the first row, and determine that the generated record hash value is the same as 'i68dxf' which is the search hash value included in the first row of the search table 650. In this case, since the record hash value and the search hash value are unique hash values generated through the same record (i.e., yellow), the record hash value and the search hash value may be the same as each other (i.e., i68dxf).

The processor 130 may record '5' which is a record (i.e., a record to be aggregated) of a second column 642 of the table 640 in a first column 661 of the result table 660 based on '1' which is the out column index of the first row including the same search hash value as the record hash value in the search table 650. In this case, the processor 130 may identify that the record of a third column 641 as the criterion of the grouping is 1 in the first row of the table 640 and record '5' in the first row of the result table 660.

Figure 6B:
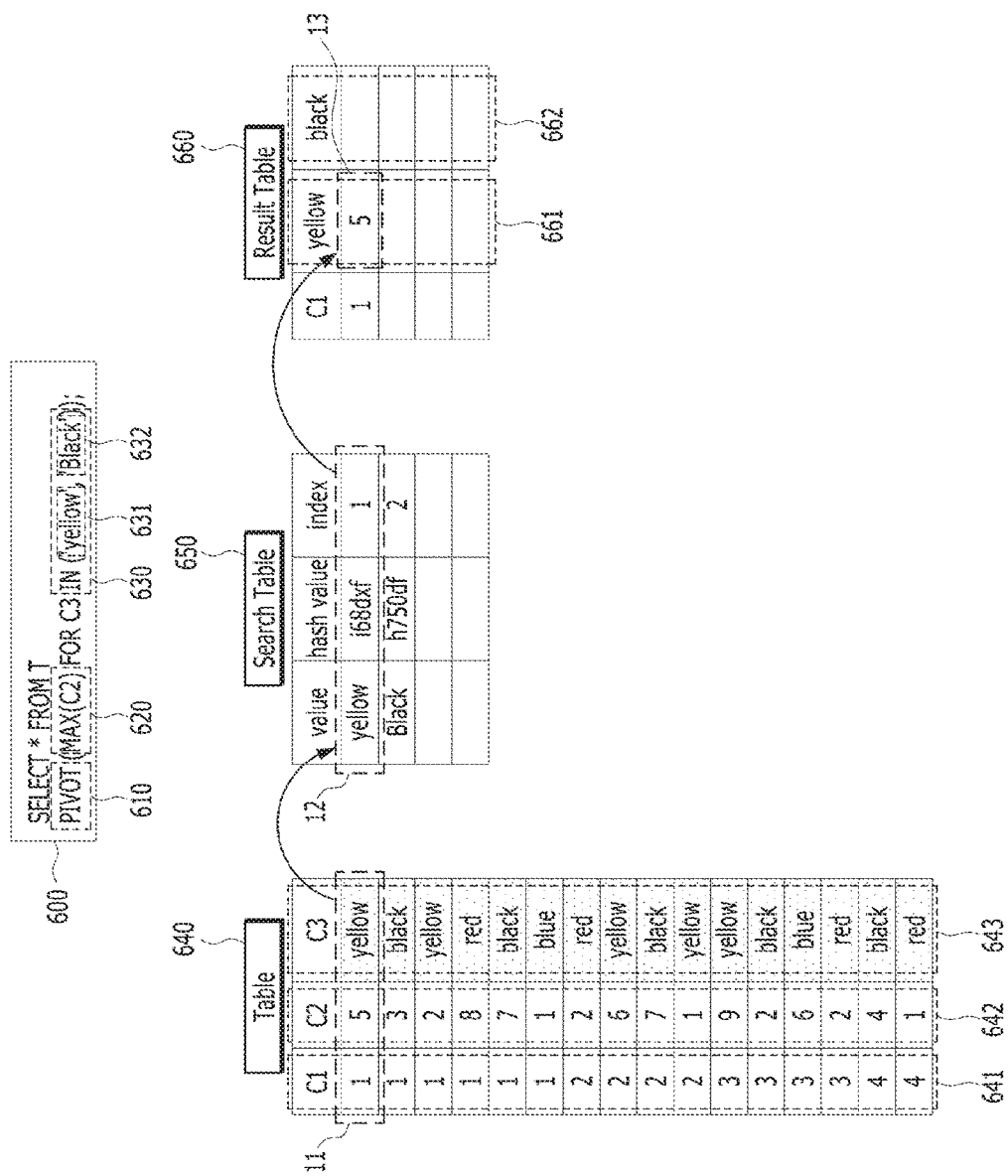

In other words, referring to FIG. 6B, the processor 130 may verify that the record hash value of the record of the first column 643 among the records included in a first row 11 of the table 640 and the hash value included in the first row 12 of the search table 650 are the same as each other and determine to record '5' which is the record of the second column 642 in the first column 661 of the result table 660 based on a fact that the out column index of the first row 12 of the search table 650 is 1. Further, the processor 130 may identify that the record of the third column 641 as the criterion of the grouping among the records of the first row 11 of the table 640 is 1 and record '5' in the first row of the result table 660. That is, '5' which is the record of the second column 642 to be aggregated among the records included in the first row 11 of the table 640 may be recorded in a first column of the first row of the result table 660 based on the search table 650 (13).

Thereafter, the processor 130 may read the second row of the table 640 and generate the record hash value for 'black' which is the record of the first column 643 among the records included in the second row and determine that the generated record hash value is the same as 'h750df' which is the search hash value included in the second row of the search table 650. The processor 130 may record '3' which is the record of the second column 642 of the table 640 in a second column 662 of the result table based on '2' which is the out column index of the second row including the same search hash value as the record hash value in the search table 650. In this case, the processor 130 may identify that the record of a third column 641 as the criterion of the grouping is 1 in the first row of the table 640 and record '3' in the first row of the result table 660.

Figure 6C:
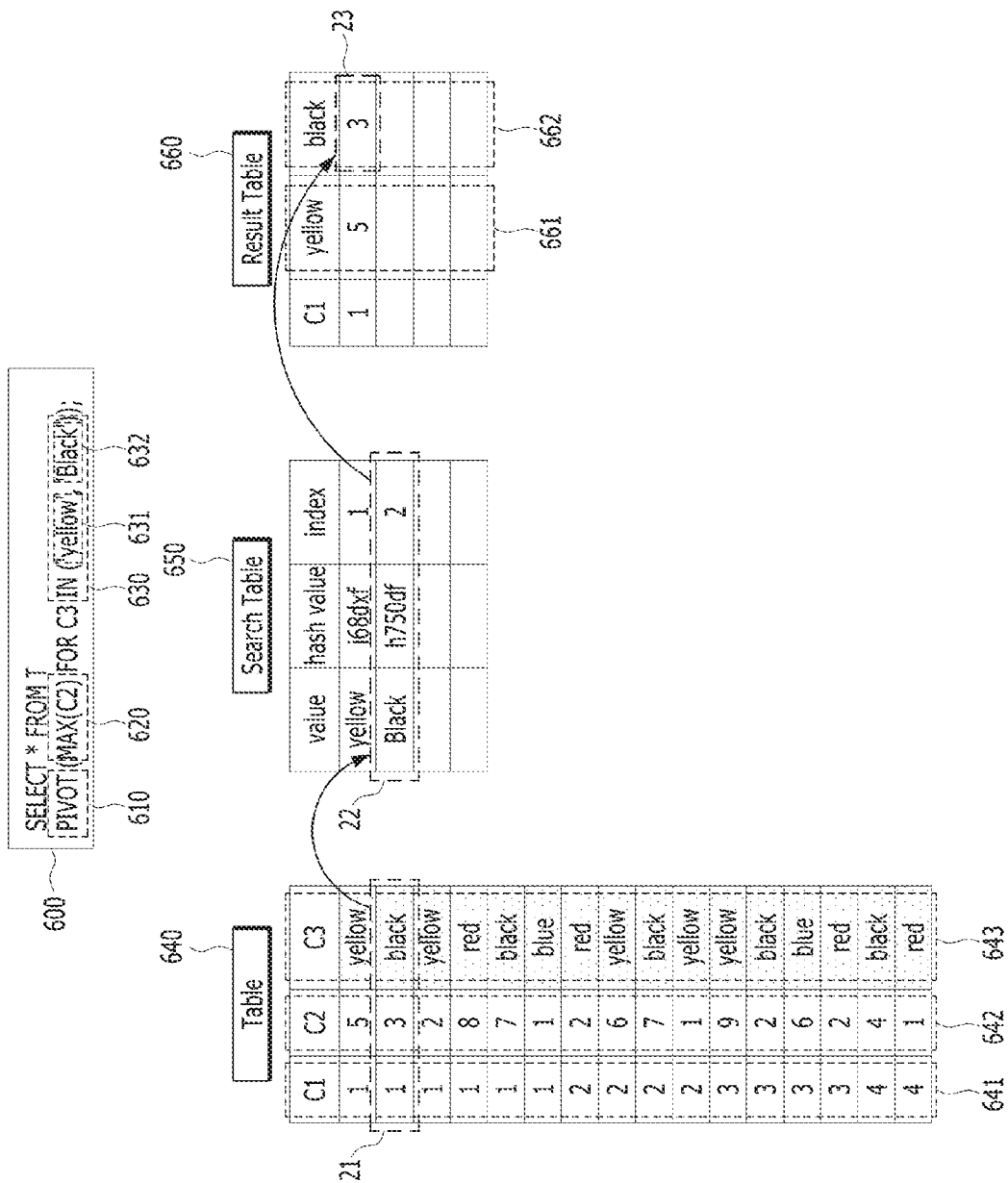

In other words, referring to FIG. 6C, the processor 130 may verify that the record hash value of the record of the first column. 643 among the records included in the second row 21 of the table 640 and the hash value included in the first row 22 of the search table 650 are the same as each other and determine to record '3' which is the record of the second column 642 in the second column 662 of the result table 660 based on a fact that the out column index of the second row 12 of the search table 650 is 2. Further, the processor 130 may identify that the record of the third column 641 as the criterion of the grouping among the records of the second row 11 of the table 640 is 1 and record '3' in the first row of the result table 660. That is, '3' which is the record of the second column 642 to be aggregated among the records included in the second row 21 of the table 640 may be recorded in a second column of the first row of the result table 660 based on the search table 650 (23).

Thereafter, the processor 130 may generate the record hash value for 'yellow' which is the record of the first column among the records included in the third row of the table 640 and determine that the generated record hash value is the same as 'i68dxf' which is the search hash value included in the first row of the search table 650. The processor 130 may intend to record '2' which is a record of a second column of the table 640 in the first column of the result table 660 based on '1' which is the out column index of the first row including the same search hash value as the record hash value in the search table 650. In this case, the processor 130 may identify that the record of the third column as the criterion of the grouping is 1 in the first row of the table 640 and perform the aggregation based on '2' which is the record of the second column C2 of the third row of the table 640 read in the first row of the t table 660. In this case, since the corresponding query is a query that returns the max value based on a fact that a value recorded in the first column (yellow column) of the first row of the result table is 5 (that is, the record of column C2 of the first row of the table 640), the processor 130 may discard '2' and maintain 5 which is the recorded value.

Figure 6D:
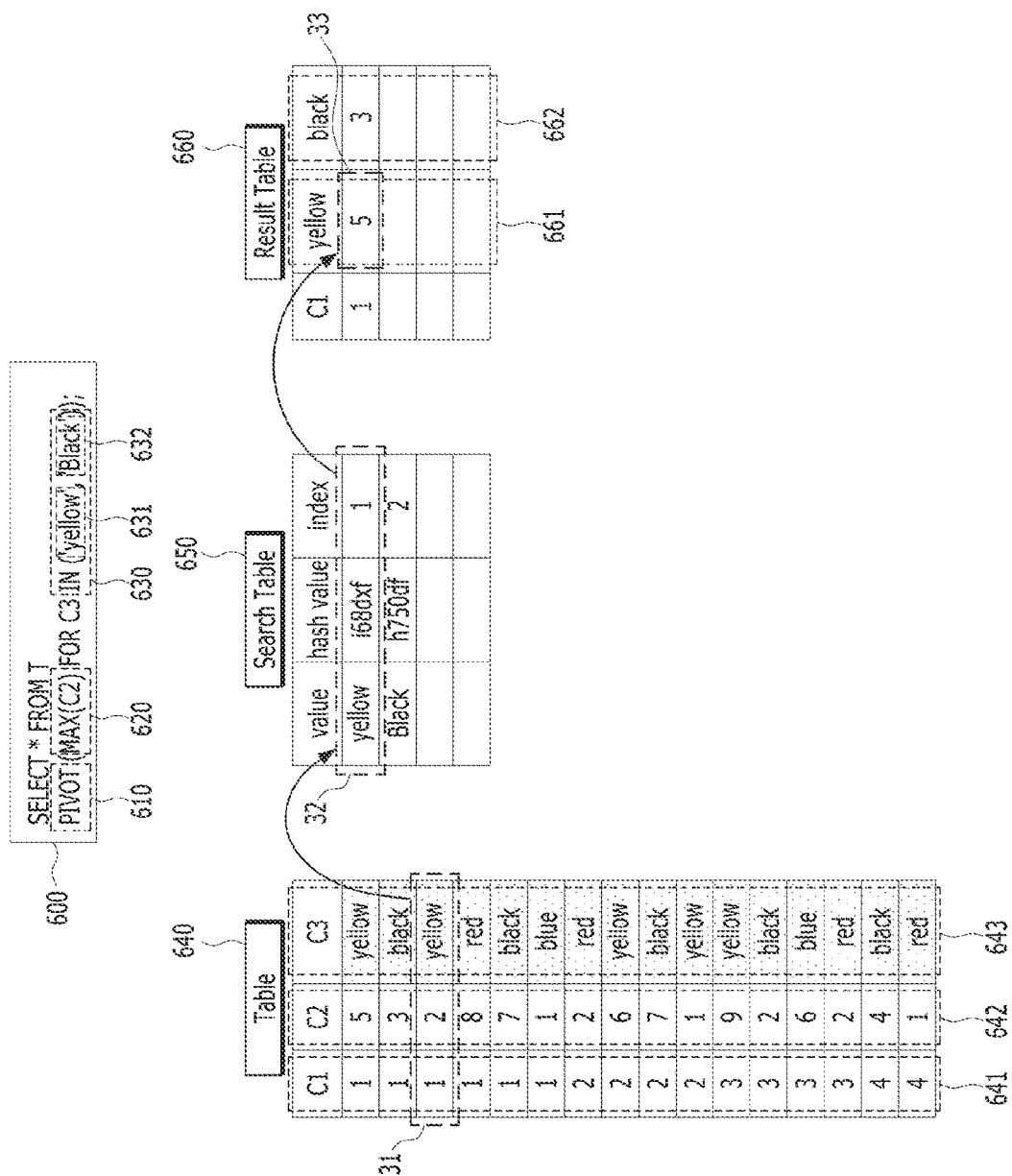

In other words, referring to FIG. 6D, the processor 130 may verify that the record hash value of the record of the first column 643 among the records included in a third row 31 of the table 640 and the hash value included in the first row 12 of the search table 650 are the same as each other and determine to record '2' which is the record of the second column 642 in the first column 661 of the result table 660 based on a fact that the out column index of the first row 12 of the search table 650 is 1. Further, the processor 130 may identify that the record of the third column 641 as the criterion of the grouping among the records included in the third row 31 of the table 640 is 1 and intend to record '2' in the first row of the result table 660. That is, the processor 130 may intend to record '2' which is the record of the first column 642 to be aggregated among the records included in the third row 31 of the table 640 in the first column of the first row of the result table 660. However, in this case, since '5' which is the record to be aggregated is recorded in advance in the first row 31 of the table 640, the processor 130 may compare '5' which is recorded in advance and '2' and maintain '5' which is the larger value (33).

Thereafter, the processor 130 may generate the record hash value 'red' which is the record of the first column 643 among the records included in the fourth row of the table 640 and determine that the search hash value which is the same as the generated record hash value does not exist in the search table 650. In this case, the processor 130 may determine to discard the read records of the fourth row and perform an operation for a subsequent row without recording and aggregating the records included in the fourth row of the table 640. In this case, not an original record but the hash value is generated for 'red' and compared with the hash value of the search table to more rapidly determine whether the same record exists by using a property of the hash value. That is, the hash value may be significantly different even though only a part of the original record is different, and as a result, the processor 130 may stop comparing the corresponding record (i.e., since it is confirmed that the corresponding record is not the same original record) and compare a subsequent record only when a different bit is discovered without comparing all bits of the original record.

In other words, referring to FIG. 6E, the processor 130 may determine that the record hash value of the record of the first column 643 among the records included in the fourth row 41 of the table 640 does not coincide with one or more search hash values included in the search table 650 and compare the record for the fifth row which is the subsequent row of the table 640.

Thereafter, the processor 130 may generate the record hash value for 'black' which is the record of the first column 643 among the records included in the fifth row of the table 640 and determine that the generated record hash value is the same as 'h750df' which is the search hash value included in the second row of the search table 650. The processor 130 may record '7' which is the record of the second column 642 of the fifth row of the table in a second column 662 of the result table 660 based on '2' which is the out column index of the second row including the search hash value which is the same as the record hash value in the search table 650. In this case, the processor 130 may identify that the record of a third column 641 as the criterion of the grouping is 1 in the first row of the table 640 and record '7' in the first row of the result table 660. In this case, first, '3' which is the value recorded in the black column of the first row of the result table 660 may be discarded based on a fact that the query in the example of FIG. 6A is the max query that returns the max value and '7' which is a new maximum value may be recorded.

Figure 6F:
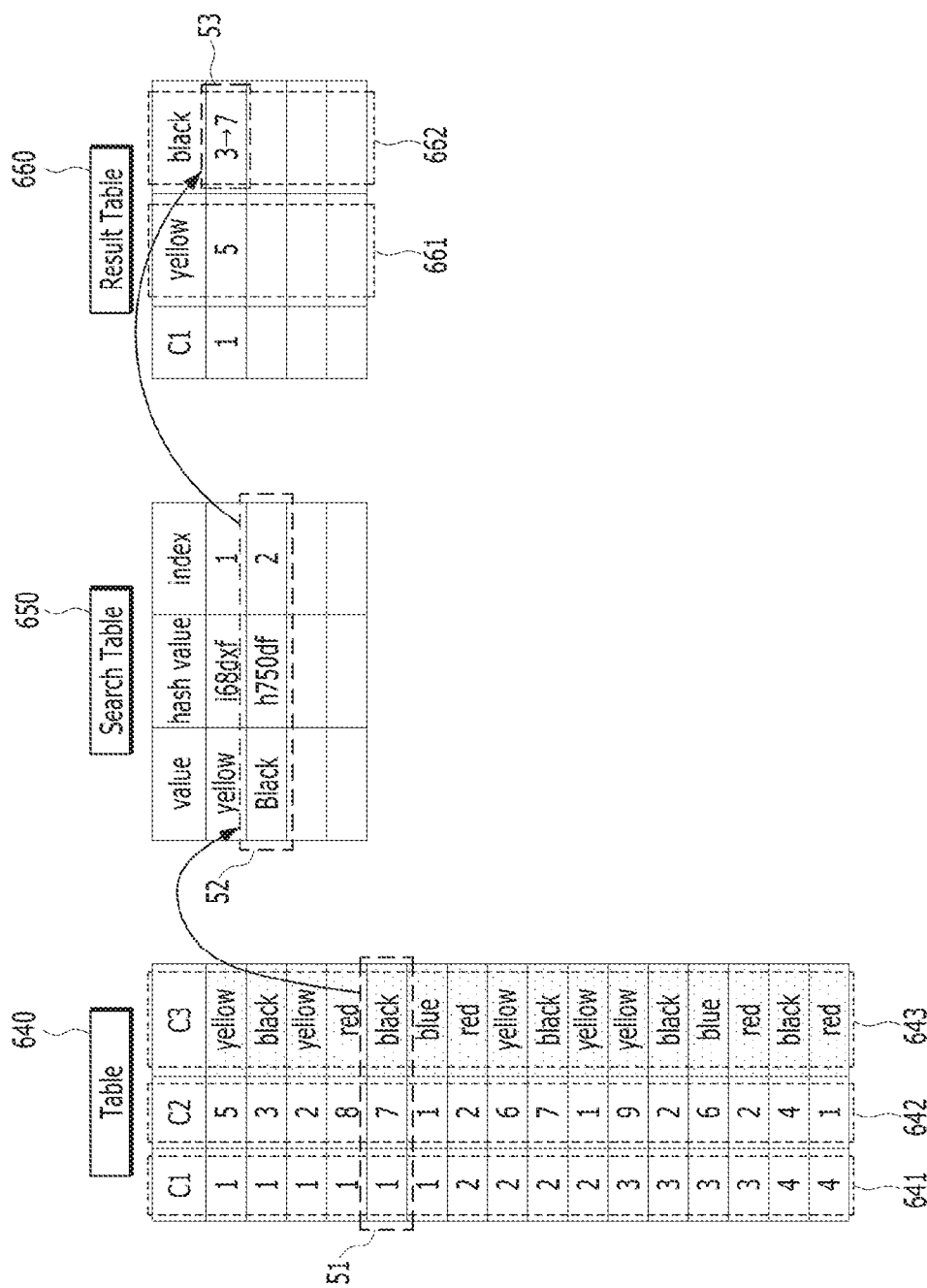

In other words, referring to FIG. 6F, the processor 130 may verify that the record hash value of the record of the first column 643 among the records included in the fifth row 51 of the table 640 and the hash value included in the first row 22 of the search table 650 are the same as each other and intend to record '7' which is the record of the second column 642 in the second column 662 of the result table 660 based on a fact that the out column index of the second row 22 of the search table 650 is 2. Further, the processor 130 may identify that the record of the third column 641 as the criterion of the grouping among the records included in the fifth row 51 of the table 640 is 1 and intend to record '7' in the first row of the result table 660. That is, the processor 130 may intend to record '7' which is the record of the first column 642 to be aggregated among the records included in the fifth row 51 of the table 640 in the first column of the first row of the result table 660. However, in this case, since '3' which is the record to be aggregated in the second row 31 of the table 640 is recorded in advance in the result table 660, the processor 130 may compare '2' which is recorded in advance and '7' and maintain '7' which is the larger value (53). Thereafter, the processor 130 may generate the record hash value for 'blue' which is the record of the first column 643 among the records included in the sixth row of the table 640 and determine that the search hash value which is the same as the generated record hash value does not exist in the search table 650. In this case, the processor 130 may determine to perform an operation for a subsequent row without recording and aggregating the records included in the sixth row of the table 640.

That is, as a result of comparing the first to sixth rows of the table 640 with the search table 650 and recording and aggregating the first to sixth rows in the result table 660 by the processor 130, '5' which is the record of the second column 642 of the first row of the table 640 may be recorded in the first column 661 of the first row of the result table 660 (33) and '7' which is the record of the second column of the fifth row of the table 640 may be recorded in the second column 662 of the first row (53).

Thereafter, the processor 130 may generate the record hash value for 'red' which is the record of the first column 643 among the records included in the seventh row of the table 640 and determine that the search hash value which is the same as the generated record hash value does not exist in the search table 650. In this case, the processor 130 may determine to perform an operation for a subsequent row without recording and aggregating the records included in the seventh row of the table.

Thereafter, the processor 130 may generate the record hash value for 'yellow' which is the record of the first column 643 among the records included in the eighth row of the table 640 and determine that the generated record hash value is the same as 'i68dxf' which is the search hash value included in the first row of the search table 650. The processor 130 may record '6' which is the record of the second column 642 of the table in the first column 661 of the result table based on '1' which is the out column index of the first row including the search hash value which is the same as the record hash value in the search table. In this case, the processor 130 may identify that the record of the third column 641 as the criterion of the grouping is 2 in the first row of the table and record '6' in the second row of the result table.

When the operation of the processor 130 is repeated similarly in ninth to sixteenth rows included in the table, the result table 660 illustrated in FIG. 6A may be generated.

That is, the processor 130 aggregates one or more records included in the table 640 for each group for a column through the record which becomes the reference of the classification and a row which becomes the reference of the grouping to generate a pivot type result table 660. In this case, the processor 130, through the search table 650 maintained on the memory, may minimize the computation through one comparison by the hash value of the search table 650 for each row of the table rather than comparing one or more records included in the table with one or more classification factors identified from the query (that is, performing a comparison for two checking processes of each of the first to sixteenth rows of the table is 'yellow' or 'black'). In other words, a result table (or a pivot table) may be generated by more efficiently processing a pivot query having a large number of classification criteria, thereby enhancing the performance of the pivot query processing in the DBMS.

Figure 3:
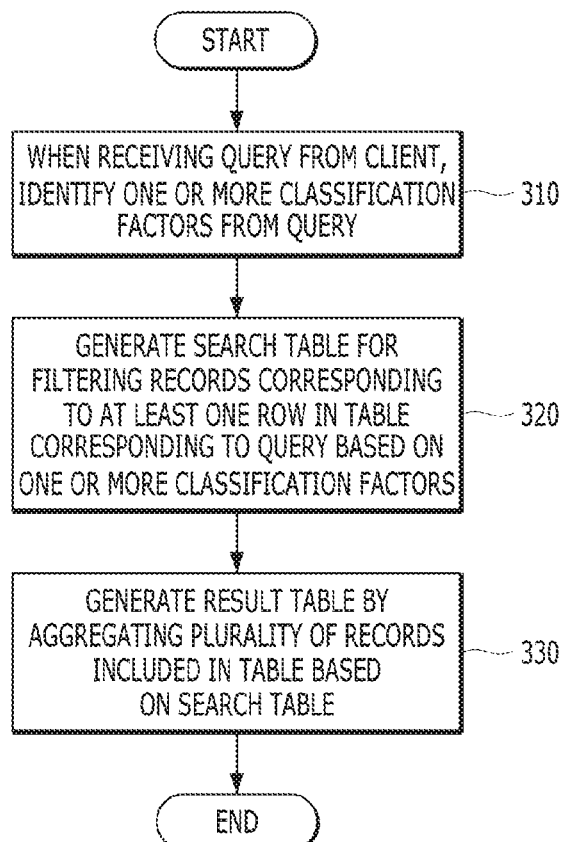
FIG. 3 is a flowchart exemplarily illustrating a method for processing a pivot query in a database management system according to an exemplary embodiment of the present disclosure.

FIG. 3 is a flowchart exemplarily illustrating a method for processing a pivot query in a database management system according to an exemplary embodiment of the present disclosure.

According to an exemplary embodiment of the present disclosure, when receiving a query from the client 200, the computing device 100 may identify one or more classification factors from the query (310).

According to an exemplary embodiment of the present disclosure, the computing device 100 may generate a search table for filtering records corresponding to at least one row in a table corresponding to the query based on one or more classification factors (320).

According to an exemplary embodiment of the present disclosure, the computing device 100 may generate a result table by aggregating a plurality of records included in the table based on the search table (330).

The steps of FIG. 3 described above may be changed in order as necessary, and at least one or more steps may be omitted or added. That is, the aforementioned steps are just an exemplary embodiment of the present disclosure and the scope of the present disclosure is not limited thereto.

Figure 7:
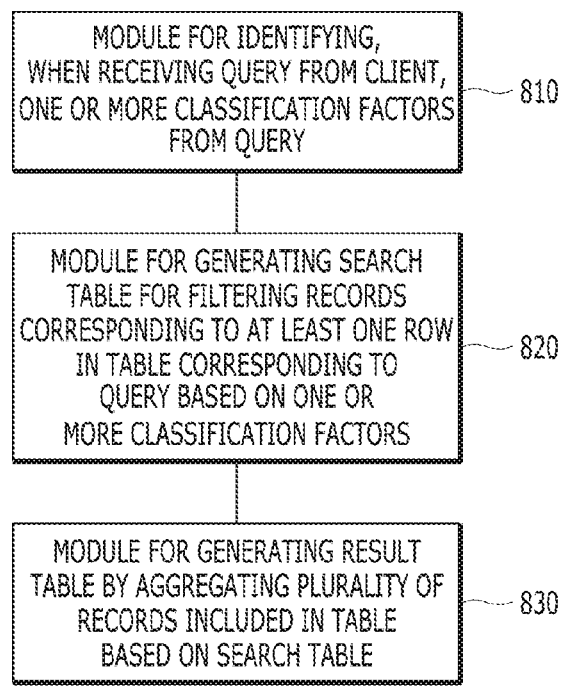
FIG. 7 illustrates a module for processing a pivot query in a database management system according to an exemplary embodiment of the present disclosure.

FIG. 7 illustrates a module for processing a pivot query in a database management system according to an exemplary embodiment of the present disclosure.

According to an exemplary embodiment of the present disclosure, a computer program may be implemented by the following modules.

According to an exemplary embodiment of the present disclosure, the computer program may include a module for identifying, when receiving a query from the client, one or more classification factors from the query, a module for generating a search table for filtering records corresponding to at least one row in a table corresponding to the query based on one or more classification factors, and a module for generating a result table by aggregating a plurality of records included in the table based on the search table.

Alternatively, when the query is received from the client, an operation of identifying one or more classification factors from the query may include an operation of identifying a structured query language (SQL) for a pivot in the received query and an operation of identifying factors in an IN clause as the one or more classification factors in the SQL when the SQL for the pivot is identified.

Alternatively, the module for generating the search table for filtering the records corresponding to at least one row of the table corresponding to the query based on the one or more classification factors may include a module for generating search hash values corresponding to the one or more classification factors, respectively and a module for generating the search table by mapping the one or more classification factors, the search hash values, and the out column indexes to the same row.

Alternatively, the search hash value as a value uniquely generated to correspond to each of one or more classification factors may be information for identifying rows corresponding to one or more classification factors in the table corresponding to the query.

Alternatively, the out column index may be address information of a column of the result table for outputting an aggregation result for a plurality of records included in the table to correspond to one or more classification factors, respectively.

Alternatively, the module for generating the result table by aggregating the plurality of records included in the table based on the search table may include a module for reading one or more rows included in the table, a module for identifying one or more records included in each of the one or more rows and a module for comparing the one or more records included in each of the one or more rows with the search table, and sequentially recording the one or more records included in the table in the result table and aggregating the sequentially recorded records.

Alternatively, the module for identifying the one or more records included in each of the one or more rows may include a module for identifying records of a first column corresponding to one or more classification factors identified from the query among the one or more records included in each of the one or more rows, a module for identifying records of a second column to be aggregated among the one or more records included in each of the one or more rows, and a module for identifying records of a third column as the criterion of grouping among the one or more records included in each of the one or more rows.

Alternatively, the module for comparing the one or more records included in each of the one or more rows with the search able, and sequentially recording the one or more records included in the table in the result table and aggregating the sequentially recorded records may include a module for comparing record hash values for the records of the first column corresponding to the one or more classification factors in each of the one or more rows and one or more search hash values included in the search table, a module for identifying a row where a search hash value having the same hash value as the record hash value for the record of the first column is located in the search table, and a module for sequentially recording the records of the second column to be aggregated in the result table based on the out column index included in the identified row and aggregating the sequentially recorded records.

Alternatively, the module for sequentially recording the second records to be aggregated in the result table based on the out column index included in the identified row and aggregating the sequentially recorded records may include a module for generating one or more groups based on records of a third column as the criterion of grouping among the one or more records included in each of the one or more rows and a module for sequentially recording the records of the second column in the result table based on the generated one or more groups and the out column index and aggregating the sequentially recorded records for each of the one or re groups.

Alternatively, the result table may include columns based on the one or more respective classification factors, include respective rows based on one or more records as the criterion of the grouping in each row of the table, and one or more result values computed through the aggregation of one or more records to be aggregated for each group to correspond to the columns and the rows.

According to an exemplary embodiment of the present disclosure, in the database management system, a module for processing the pivot query may be implemented by a means, a circuit, or a logic for implementing the computing program.

Those skilled in the art need to recognize that various illustrative logical blocks, configurations, modules, circuits, means, logic, and algorithm steps described in connection with the exemplary embodiments disclosed herein may be additionally implemented as electronic hardware, computer software, or combinations of both sides. To clearly illustrate the interchangeability of hardware and software, various illustrative components, blocks, structures, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application, but such implementation decisions should not be interpreted as causing a departure from the scope of the present disclosure.

FIG. 8 is a simple and general schematic view of an exemplary computing environment in which exemplary embodiments of the present disclosure may be implemented.

The present disclosure has generally been described above in association with a computer executable command which may be executed on one or more computers, but it will be well appreciated by those skilled in the art that the present disclosure can be implemented through a combination with other program modules and/or a combination of hardware and software.

In general, the program module includes a routine, a procedure, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Any medium accessible by a computer may be a computer readable medium, and the computer readable medium may include a computer readable storage medium and a computer readable transmission medium. The computer readable storage includes volatile and nonvolatile media and movable and non-movable media. The computer readable storage media include volatile and non-volatile media and movable and non-movable media implemented by a predetermined method or technology for storing information such as a computer readable command, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally include information transfer media that implement the computer readable command, the data structure, the program module, or other data in a carrier wave or a modulated data signal such as other transport mechanism. The term "modulated data signal" means a signal acquired by configuring or changing at least one of characteristics of the signal so as to encode information in the signal. As not a limit but an example, the computer readable transmission media include wired media such as a wired network or a direct-wired connection and wireless media such as acoustic, RF, infrared and other wireless media. A combination of any media among the aforementioned media is also included in a range of the computer readable transmission media.

An exemplary environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor and other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an internal hard disk drive (HDD) 1114 (for example, EIDE and SATA) the internal hard disk drive (HDD) 1114 may also be configured for an external purpose in an appropriate chassis (not illustrated), a magnetic floppy disk drive (FDD) 1116 (for example, for reading from or writing in a mobile diskette 1118), and an optical disk drive 1120 (for example, for reading a CD-ROM disk 1122 or reading from or recorded in other high-capacity optical media such as the DVD). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an exterior drive includes at least one of a universal serial bus (USB) and an IEEE 1394 interface technology or both of them.

The drives and the computer readable media associated therewith provide non-volatile storage of the data, the data structure, the computer executable command, and others. In the case of the computer 1102, the drives and the media correspond to storing of predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an exemplary operating environment and further, the predetermined media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached by the RAM 1112. It will be well appreciated that the present disclosure may be implemented in various operating systems which are commercially usable or a combination of the operating systems.

A user may input commands and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1104, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes a speaker, a printer, and other peripheral output devices (not illustrated).

The computer 1102 may operate in a networked environment by using a logical connection to one or more remote computers including remote computer(s) 1148 through wired and/or wireless communication. The remote computer(s) 1148 may be a workstation, a server computer, a router, a personal computer, a portable computer, a micro-processor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158, is connected to a communication server on the WAN 1154, or has other means that configure communication through the WAN 1154 such as the Internet, etc. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that an illustrated network connection is exemplary and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and a Bluetooth wireless technology. Accordingly, communication may be a predefined structure like the network in the related art or just ad hoc communication between at least two devices.

The Wi-Fi enables connection to the Internet, and the like without a wired cable. The Wi-Fi is a wireless technology such a device, for example, a cellular phone which enables the computer to transmit and receive data indoors or outdoors, that is, anywhere in a communication range of a base station. The network uses a wireless technology called IEEE 802.11 (a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It may be appreciated by those skilled in the art that various exemplary logical blocks, modules, processors, means, circuits, and algorithm steps described in association with the exemplary embodiments disclosed herein may be implemented by electronic hardware, various types of programs or design codes (for easy description, herein, designated as "software"), or a combination of all of them. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be analyzed that the implementation determination departs from the scope of the present disclosure.

Various exemplary embodiments presented herein may be implemented as manufactured articles using a method, an apparatus, or a standard programming and/or engineering technique. The term "manufactured article" includes a computer program, a carrier, or a medium which is accessible by a predetermined computer-readable device. For example, a computer readable medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information. The term "machine-readable media" includes a wireless channel and various other media that can store, possess, and/or transfer commands) and/or data, but is not limited thereto.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but it does not mean that the method claims are limited to the presented specific order or hierarchical structure.

The description of the presented embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the exemplary embodiments presented herein, but should be analyzed within the widest range which is consistent with the principles and new features presented herein.

What is claimed is:

1. A non-transitory computer readable medium storing computer program, wherein the computer program executes operations for performing a pivot query when the computer program is executed by one or more processors, the operations comprising:
   identifying one or more classification factors from a query when receiving the query from a client;
   generating a search table for filtering one or more records corresponding to at least one row of a table corresponding to the query based on the one or more classification factors; and
   generating a result table by performing an aggregation of a plurality of records included in the table based on the search table,
   wherein the generating a result table by performing an aggregation of a plurality of records included in the table based on the search table includes:
   reading one or more rows included in the table;
   identifying one or more records included in each of the one or more rows; and
   performing the aggregation, by comparing the one or more records included in each of the one or more rows and the search table and sequentially writing in the result table the one or more records included in the table.

2. The non-transitory computer readable medium of claim 1, wherein the identifying one or more classification factors from a query when receiving the query from a client includes:
   identifying an SQL(Structured Query Language) for a pivot in the received query; and
   identifying one or more factors within IN clause the SQL as the one or more classification factors if the query has the SQL for the pivot.

3. The non-transitory computer readable medium of claim 1, wherein the one or more classification factors are a record serving as a reference for classifying a plurality of records included in the table and the basis of each column in the result table.

4. The non-transitory computer readable medium of claim 1, wherein the generating a search table for filtering one or more records corresponding to at least one row of a table corresponding to the query based on the one or more classification factors includes:
   generating a search hash value corresponding to each of one or more classification factors; and generating the search table by including each of the one or more classification factors, the search hash value and out column index in each of row.

5. The non-transitory computer readable medium of claim 4, wherein the search hash value is a value unique to each of the one or more classification factors and information for identifying a row corresponding to each of the one or more classification factors in the table corresponding to the query.

6. The non-transitory computer readable medium of claim 4, wherein the out column index is an address information for outputting an aggregation result for the plurality of records included in the table based on each of the one or more classification factors.

7. The non-transitory computer readable medium of claim 1, wherein the identifying one or more records included in each of the one or more rows includes:
   identifying a record of a first column corresponding to one or more classification factors identified the query, among one or more records included in each of the one or more rows;
   identifying a record of a second column that is a subject of the aggregation, among the one or more records included in each of the one or more rows; and
   identifying a record of a third column which is a reference of grouping, among the one or more records included in each of the one or more rows.

8. The non-transitory computer readable medium of claim 1, wherein the performing the aggregation, by comparing the one or more records included in each of the one or more rows and the search table and writing the one or more records included in the table to the result table sequentially includes:
   comparing a record hash value of a first column corresponding to one or more classification factors and one or more search hash values, in each of the one or more rows;
   identifying a row in which a search hash value with the same hash value as a record hash value for the record of the first column is located, in the search table; and
   performing the aggregation by sequentially writing in the result table a record of a second column which is subject of the aggregation based on an out column index included in the identified row.

9. The non-transitory computer readable medium of claim 8, wherein the performing the aggregation by sequentially writing in the result table a record of a second column which is a subject of the aggregation based on an out column index included in the identified row includes:
   generating one or more groups based on a record of a third column which is a reference of grouping, among one or more records included in each of the one or more rows; and
   performing the aggregation for each of one or more groups by writing a record of a second column in the result table sequentially based on the generated one or more groups and the out column index.

10. The non-transitory computer readable medium of claim 1, wherein the result table includes:
   one or more column based on the one or more classification factors,
   one or more rows based on one or more records which is a reference of grouping in each row of the table and
   one or more aggregation result values calculated by group-by-group aggregation of one or more records subject to the aggregation corresponding to the one or more columns and the one or more rows.

11. A method for performing pivot query, the method comprising:
   identifying one or more classification factors from a query when receiving the query from a client;
   generating a search table for filtering one or more records corresponding to at least one row of a table corresponding to the query based on the one or more classification factors; and
   generating a result table by performing an aggregation of a plurality of records included in the table based on the search table,
   wherein the generating a result table by performing an aggregation of a plurality of records included in the table based on the search table includes:
      reading one or more rows included in the table;
      identifying one or more records included in each of the one or more rows; and
      performing the aggregation, by comparing the one or more records included in each of the one or more rows and the search table and sequentially writing in the result table the one or more records included in the table.

12. A computing device for performing a pivot query, the computing device comprising:
   a processor including one or more cores;
   a storage storing program codes executable by the processor; and
   a network unit transmitting and receiving data with a client,
   wherein the processor is configured to:
      identify one or more classification factors from a query when receiving the query from a client;
      generate a search table for filtering one or more records corresponding to at least one row of a table corresponding to the query based on the one or more classification factors; and
      generate a result table by performing an aggregation of a plurality of records included in the table based on the search table, and
   wherein the processor is configured to:
      read one or more rows included in the table;
      identify one or more records included in each of the one or more rows; and
      perform the aggregation, by comparing the one or more records included in each of the one or more rows and the search table and sequentially writing in the result table the one or more records included in the table.

* * * * *